(12) United States Patent
Cheslow

(10) Patent No.: US 8,176,030 B2
(45) Date of Patent: May 8, 2012

(54) SYSTEM AND METHOD FOR PROVIDING FULL-TEXT SEARCH INTEGRATION IN XQUERY

(75) Inventor: Robert D. Cheslow, Los Angeles, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 434 days.

(21) Appl. No.: 12/370,530

(22) Filed: Feb. 12, 2009

(65) Prior Publication Data

US 2009/0157671 A1    Jun. 18, 2009

Related U.S. Application Data

(63) Continuation of application No. 10/914,903, filed on Aug. 10, 2004, now Pat. No. 7,493,338.

(51) Int. Cl.
 *G06F 17/30* (2006.01)
(52) U.S. Cl. ........................................ 707/706; 707/707
(58) Field of Classification Search .................. 707/610, 707/622, 706, 713, 716, 718, 720, 723, 728, 707/737, 741, 760, 765, 769, 803, 707
See application file for complete search history.

(56) References Cited

U.S. PATENT DOCUMENTS

| | | |
|---|---|---|
| 6,654,734 B1 | 11/2003 | Mani et al. |
| 6,718,371 B1 | 4/2004 | Lowry et al. |
| 6,918,107 B2 | 7/2005 | Lucas et al. |
| 7,072,896 B2 | 7/2006 | Lee et al. |
| 7,171,404 B2 | 1/2007 | Lindblad et al. |
| 7,574,652 B2 | 8/2009 | Lennon et al. |
| 2004/0060006 A1 | 3/2004 | Lindblad et al. |
| 2004/0073541 A1* | 4/2004 | Lindblad et al. ................ 707/3 |
| 2004/0078219 A1 | 4/2004 | Kaylor et al. |
| 2004/0167915 A1 | 8/2004 | Sundararajan et al. |
| 2004/0267900 A1 | 12/2004 | Hoekstra et al. |
| 2005/0021512 A1 | 1/2005 | Koenig |
| 2005/0154690 A1 | 7/2005 | Nitta et al. |
| 2005/0222983 A1* | 10/2005 | Schwedes ........................ 707/3 |
| 2005/0278187 A1* | 12/2005 | Bobbitt ............................ 705/1 |
| 2005/0289125 A1 | 12/2005 | Liu et al. |
| 2006/0036463 A1 | 2/2006 | Patrick et al. |

OTHER PUBLICATIONS

Warnill, Chung et al., "An Extension of Xquery for Moving Objects Over GML". Information Technology: Coding and Computing, 2004. Proceedings. ITCC 2004, International Conference in Las Vegas, NV, USA, Apr. 5-7, 2004. Piscataway, NJ, USA, IEEE, vol. 2. Apr. 5, 2004, pp. 142-147.

(Continued)

*Primary Examiner* — Tony Mahmoudi
*Assistant Examiner* — Fariborz Khoshnoodi
(74) *Attorney, Agent, or Firm* — Patrick J. S. Inouye; Krista A. Wittman

(57) ABSTRACT

A system and method for providing full-text search integration in XQuery is presented. A built-in search function defined in an XQuery language is implemented, and a full-text search is initiated. The search function includes one or more search terms and a relation logic. Variants for each search term in the search function are identified. Posting lists are obtained for one or more of the variants. Each posting list includes values offset from elements containing the search term associated with the variant to which the posting list corresponds. The relation logic is applied to the offset values of the posting lists. Those elements with offset values that satisfy the relation logic are selected. The elements that satisfy the relation logic are provided as results of the full-text search.

20 Claims, 2 Drawing Sheets

OTHER PUBLICATIONS

Ji-Hoon Kang et al., "An Xquery Engine for Digital Library Systems That Support XML Data", Applications and the Internet Workshops, 2004. Saint 2004 Workshops, 2004, International Symposium on Jan. 26-30, 2004. Piscataway, NJ, USA, IEEE Jan. 26, 2004, pp. 233-237.

* cited by examiner

SYSTEM AND METHOD FOR PROVIDING FULL-TEXT SEARCH INTEGRATION IN XQUERY

CROSS-REFERENCE TO RELATED APPLICATIONS

This patent application is a continuation of U.S. patent application Ser. No. 10/914,903, filed Aug. 10, 2004, pending, the priority filing date of which is claimed, and the disclosure of which is incorporated by reference.

The following, U.S. patent application Ser. No. 10/914,877, filed Aug. 10, 2004, titled "Extension of XQuery in a High Performance XML/XQuery Database", U.S. patent application Ser. No. 10/915,529, filed Aug. 10, 2004, titled "High Performance XML Storage Retrieval System and Method," and U.S. Pat. No. 7,296,034, issued Nov. 13, 2007, to Cheslow, titled "Integrated Support in an XML/XQuery Database for Web-based Applications," are assigned to the same assignee of the present application. The entire disclosures are totally incorporated herein by reference in their entirety.

INCORPORATION BY REFERENCE

The following U.S. patents are fully incorporated herein by reference; U.S. Pat. No. 6,654,734 ("System and Method for Query Processing and Optimization for XML Repositories"); U.S. Pat. No. 6,718,371 ("XML-Based Integrated Services Framework"); and U.S. Pat. No. 7,072,896 ("System and Method for Automatic Loading of an XML Document Defined by a Document-Type Definition into a Relational Database Including the Generation of a Relational Schema Therefor").

BACKGROUND

This disclosure relates generally to a computer software system and associated method for searching stored data in XML databases, and more particularly to a full-text search functionality integrated into the XQuery language.

Extensible Markup Language (XML) is a programming language operating as an extension to HTML and providing enhanced control of content. It may be used to define the content of a document (such as a Web page) rather than the presentation of it or to exchange information and documents between diverse systems. XML is text-based and formats data by using document tags to catalog information. Key elements in a document may be categorized according to meaning, enabling a search engine to scan an entire document for the XML tags that identify individual pieces of text and images rather than selecting a document by the metatags listed in its header.

There are various strategies for storing and managing XML documents. In XML repositories based on relational database technology, the XML is stored using a method known as "shredding". In this approach, the markup is broken up and stored in fields of database tables, and XML queries are translated into a relational query language (e.g. SQL, Structured Query Language) that retrieves the values from the database using relational operations, and generates the markup output. Overhead for storage is high, and performance for regeneration of the XML (or "round-tripping" of entire XML documents) is typically low. Other database managers designed specifically for XML utilize indexing schemes to process the markup representation of XML more efficiently.

Applications for querying XML databases (such as XQuery, a general-purpose XML query language) often require the ability to perform full-text search on the stored data. The search functionality must be integrated within the query language to allow for control over the structures to be searched, and to make search results available to other XQuery constructs. An example of one approach to querying XML documents is presented in U.S. Pat. No. 6,654,734, issued Nov. 25, 2003, to Mani et al. ("System and Method for Query Processing and Optimization for XML Repositories"). The query system of Mani et al. views the data in XML documents as a graph that allows queries on content, structure, inter-document links, and intra-document links. The query language is based on tree pattern match semantics using XML semantics, with features that allow the query system to compute a document type definition for the query language and use it to validate the user query formulation. Query optimization is accomplished using schema-based optimization and index-based optimization.

Another approach is described in U.S. Pat. No. 7,072,896, issued Jul. 4, 2006, to Lee et al. ("System and Method for Automatic Loading of an XML Document Defined by a Document-Type Definition into a Relational Database Including the Generation of a Relational Schema Therefor"). Under the system of Lee et al., a relational schema is created out of a DTD, and XML data is loaded into the generated relational schema that adheres to the DTD. Starting with a DTD for an XML document containing data, all of the information in the DTD is captured into metadata tables, and then the metadata tables are queried to generate the relational schema. The data contained in the XML document can then be loaded into the generated relational schema.

However, document-centric applications often benefit from powerful full-text search capabilities. It would be desirable to integrate full-text search functionality into the XQuery language in a flexible way to allow a high degree of control over both the text search patterns and the structure elements to be searched.

SUMMARY

The disclosed embodiments provide examples of improved solutions to the problems noted in the above Background discussion and the art cited therein. There is shown in these examples an improved system for full text search integration in XQuery for a binary object XML repository. The full text search integration system includes XQuery interpreter module(s) for implementing the XQuery language and function dispatcher module(s) for implementing the XQuery function calling mechanism. Search function implementation module(s) implement the component search function and interpret the full-text search query syntax. The search function postings resolution manager module(s) compute the candidate elements for search query resolution, and postings module(s) return all XML nodes that contain a specified token, with a token corresponding to a piece of XML syntax.

A further embodiment provides a system and method for providing full-text search integration in XQuery. A built-in search function defined in an XQuery language is implemented and a full-text search is initiated. The search function includes one or more search terms and a relation logic. Variants for each search term in the search function are identified. Posting lists are obtained for one or more of the variants. Each posting list includes values offset from elements containing the search term associated with the variant to which the posting list corresponds. The relation logic is applied to the offset values of the posting lists. Those elements with offset values that satisfy the relation logic are selected. The elements that satisfy the relation logic are provided as results of the full-text search.

In another embodiment there is disclosed a method for full text search integration in XQuery for a binary object XML repository having an XQuery interpreter module, a function dispatcher module, a search function implementation module, a search function postings resolution manager module, and a postings module. The method includes initiating a full-text search when the XQuery interpreter encounters a search function command. All matching variants in a lexicon for each search term within said search function command are identified and postings lists for each variant of each search term are collected. The posting lists are filtered according to search query Boolean logic and the posting lists are filtered for relations specified in the search query. The element matching the search query is returned to the XQuery interpreter.

In yet another embodiment, there is disclosed an article of manufacture in the form of computer usable medium having computer readable program code embodied in the medium which causes the computer to perform method steps for full text search integration in XQuery for a binary object XML repository having an XQuery interpreter module, a function dispatcher module, a search function implementation module, a search function postings resolution manager module, and a postings module. The method includes initiating a full-text search when the XQuery interpreter encounters a search function command. All matching variants in a lexicon for each search term within said search function command are identified and postings lists for each variant of each search term are collected. The posting lists are filtered according to search query Boolean logic and the posting lists are filtered for relations specified in the search query. The element matching the search query is returned to the XQuery interpreter.

BRIEF DESCRIPTION OF THE DRAWINGS

The embodiments of the invention will be described in detail, with reference to the following figures wherein.

DETAILED DESCRIPTION

Figure 1:
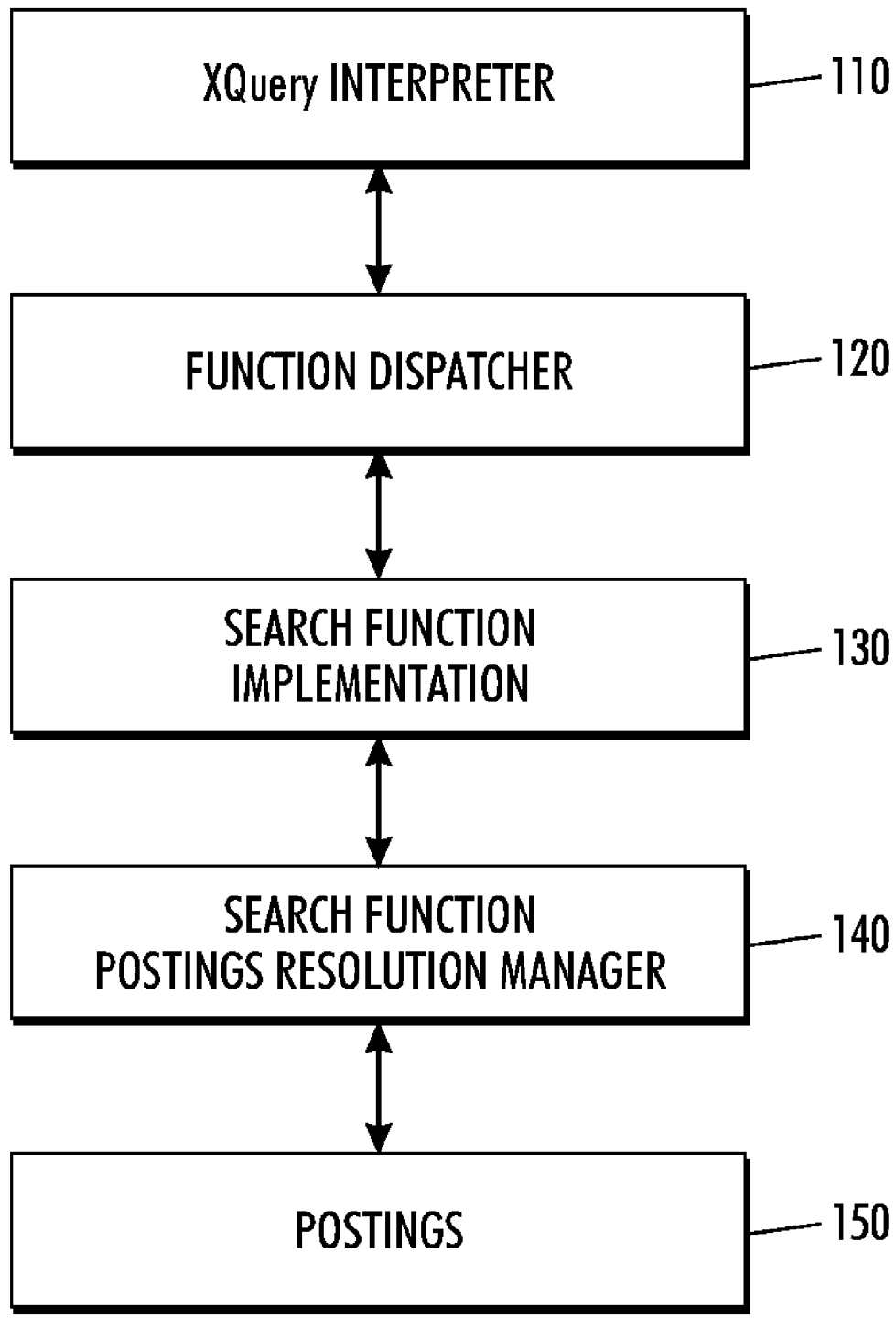
FIG. 1 is a schematic diagram of an example embodiment of the full-text search integration in XML database system.

The system and method described herein are based on the addition of a "search" function to the functions supported by XQuery, a language specification from the W3C standards organization. XQuery implementations allow querying of XML documents and also specifies functions which process or filter XML data. A set of built-in functions are specified as part of the language, and other functions can be defined by the query-writer as part of a query. The function may be used within the existing XQuery syntax. Arguments to the function specify the data to be searched and a search expression to evaluate. Hit counts are associated with result nodes internally and made available via another function called "score." High performance, and proximity and work-order matching, is realized by using the search postings present in the Binary Object XML Repository (BOXR) storage format, described in related, U.S. patent application Ser. No. 10/915,529, filed Aug. 10, 2004, pending, titled "High Performance XML Storage Retrieval System and Method", the disclosure of which is fully incorporated by reference hereinabove. Briefly, BOXR includes import manager capabilities for converting file formats to XML. Indexing capabilities encode XML document data in a binary data structure for storage within lexicon(s) in the form of tokens and token types, with a token including data elements corresponding to XML syntax. The lexicon(s) also assigns token identifier numbers, which sequence module(s) store in an original sequence. Postings module(s) map the token identifier numbers to the token identifier's position in the original sequence.

In the following description numerous specific details are set forth in order to provide a thorough understanding of the system and method. It would be apparent, however, to one skilled in the art to practice the system and method without such specific details. In other instances, specific implementation details have not been shown in detail in order not to unnecessarily obscure the present invention.

Various computing environments may incorporate capabilities for providing full-text search in XML databases. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communications network. In a distributed computing environment, program modules may be located in both local and remote memory storage devices.

Referring to FIG. 1, a system diagram of one embodiment of the full-text search for XML databases is shown. At 110 the BOXR XQuery Interpreter Module implements the XQuery language, accepting queries and returning results. The function dispatcher acts as a code module that implements the XQuery function calling mechanism. When the XQuery interpreter encounters a function call, the interpreter invokes the function dispatcher. The function dispatcher evaluates the arguments, locates the code associated with the body of the function, invokes the implementation of the function and passes the argument values to it. Thus the query interpreter 110 invokes the function dispatcher 120, which in turn invokes the function implementation 130 and sends the argument values to it; the implementation module 130 executes and returns the results to the dispatcher, and the dispatcher returns the results of the function call back to 110. Function dispatcher 120 implements the XQuery function call mechanism. For example, the search function may take two arguments. The first argument specifies the node set (data), which is to be searched, and the second argument is the search expression to evaluate. A call to the search function could take the form:

search ($data, "{'foo' and 'bar' }").

In this example, "$data" is a variable bound to a node set (a node set is a set of XML "nodes"; with a "node" being essentially an XML element). The function dispatcher 120 retrieves the value—the node set—of the variable $data, locates the code for the search function, passes the argument values, and invokes the function code. Essentially the downward arrows in the diagram represent code invocation and passing of argument data, and the upward arrows represent the return of result data.

Search function implementation module 130 implements the built-in search function and interprets the full-text Search query syntax. Standard XQuery provides a rudimentary string search capability in the built-in function contains (data, string). The function is typically used as a predicate to filter XML data elements. BOXR incorporates full-text search functionality by adding a new built-in function, search (data, search-expression). The search function implementation module 130 contains the code that implements the search function. This code interprets the search expression language, locates the data that matches the search expression, and returns the resulting node set. To do this, the search function implementation invokes the postings resolution manager 140 and sends to it the values of the arguments.

The postings resolution manager identifies the XML nodes that contain the search terms, using the postings file. These postings are returned to the search function implementation, which then applies the logic of the search expression to determine which nodes satisfy the search expression. Search Function Postings Resolution Manager 140 computes the candidate elements for search query resolution. Several other mechanisms have been added to BOXR to enhance its usability in full-text search applications. While the standard contains function returns a Boolean value, the BOXR search function returns a score, which reflects the strength of the match found (essentially the number of matches between the search expression and the specified data element(s)). This score can be used in the XQuery order by statement to sort the results by relevance. Postings module 150 interacts with the postings file: Given a token, the postings module returns all XML nodes that contain the token. (Note that since XML elements are nested hierarchically, a token may be contained within several elements. For example in the data:

<root><a><b>foo</b></a></root> the token "foo" is contained in the scope of elements "root", "a", and "b". Which element is recorded in the postings is determined either by automatic (heuristic) means or explicitly by the database designer).

In addition, the search function stores the location of each match, so that other functions can quickly identify the words that matched the search expression. For example, there is a function that will tag matching words in the query results, and a function that will extract excerpts surrounding these words.

Figure 2:
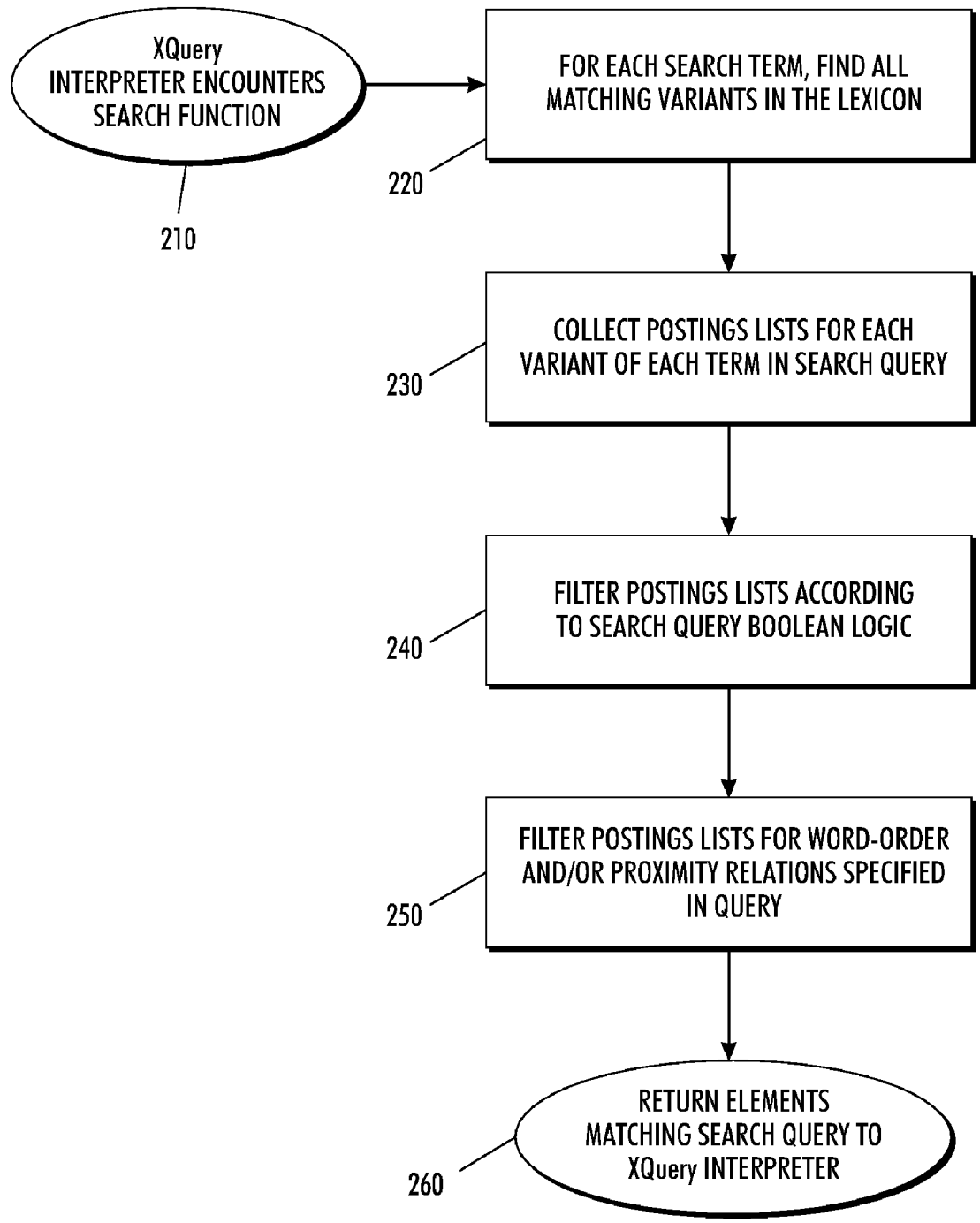
FIG. 2 is a flowchart demonstrating one embodiment of the full-text XML search integration method.

Turning now to FIG. 2, the flowchart illustrates the method of operation for the full-text search integration system. At 210 the XQuery interpreter module encounters the search function and initiates the full-text search. For each search term, all matching variants in the lexicon are found at 220, using case-insensitive, spelling correction, and/or stemming routines. Rather than simply finding occurrences of a literal string, the search expression given to the search function is written in a full-featured pattern-matching language. This language can specify nested Boolean operations (such as and, or, not), proximity and order relations (for example, find a token only when it precedes another token by less than four words), and flexible token matching (e.g. case-insensitive matching, approximate matching, and wildcard matching). Postings lists are collected for each variant of each term in the search query at 230.

The postings lists contain sequence offsets to elements containing terms in the search query. For the purposes herein, a sequence offset is the location in the sequence file for a particular token. For example, the XML fragment <root id='3'> would be represented by three tokens, "root", "id", and "3". These three tokens would be stored in the lexicon, which would assign Token IDs to the tokens, for example 1, 2, and 3 (Actually the Token IDs contain the token type information in high-order bits). These three Token IDs would be added to the sequence. The sequence offset is the offset of each Token ID in the sequence, so the sequence offset for the token "root" in this sequence would be 0, and the sequence offset for "id" would be 1, etc.

The postings lists are filtered at 240 according to the search query Boolean logic using fast ordered list union/intersect routines. For example, if the search expression specified all nodes that contained both the term "foo" and the term "bar", this would be written "{'foo' and 'bar' }". First the postings for all elements containing the term "foo" would be retrieved. These postings are the sequence offsets for the elements whose scope contains the token "foo". For the purposes of example, the postings for "foo" may be the set (100, 200, 300, 400)—meaning that at these offsets in the sequence are the elements that contain the token "foo". Then the postings for "bar" would be retrieved—for the purposes of example, this set may be (300, 400, 500, 600). Since the query expression requires that both "foo" and "bar" occur in matching nodes, the postings resolution manager computes the intersection of these postings lists, which in the example would be (300, 400). (If the expression specified a boolean OR instead of AND, the union of the two sets would be computed). In BOXR, the intersections and unions can be computed efficiently because the postings, by virtue of the way they are stored, are guaranteed to be in ascending order (i.e. ascending sequence offsets for each token).

At 250, the postings lists are filtered for word-order and/or proximity relations specified in the query, if these are specified. Continuing with the same example, posit that instead of a simple "and" in the search expression ("{'foo' and 'bar' }") that the search expression specified that "bar" must occur within four words following "foo"—this would be written "{'foo' {+4} 'bar' }". In this case, once the postings for elements containing both "foo" and "bar" had been computed, another pass would be required to identify only those elements containing both tokens with the specified word-order and proximity relationship. This pass can be accomplished efficiently because it is the integer Token IDs that are being compared rather than the token strings themselves, and integer comparisons are much faster to execute than string comparisons. Those elements matching the search query are returned to the XQuery interpreter at 260. Once the nodes that satisfy the search expression are returned to the interpreter, the results are integrated into the query processing in the same way that any function call result is processed in XQuery. The results can be regenerated back into XML, or used in further query processing. A typical use for the search function is as a "predicate" function, best explained by an example:

for $x in document("mydoc.xml")/ROOT
    where $x[search(A, "{'foo' and 'bar' }")]
    order by score($x) descending
    return $x This example can be described as follows: Assign the variable "$x" to all "ROOT" nodes in the XML document "mydoc.xml" where the "A" element directly under the root node contains the tokens "foo" and "bar", then order these nodes by the score of each in descending order (where the score is the total number of times either of these tokens occurred in the result node), and finally return these nodes.

Since BOXR maintains postings, which map each token to its occurrences within the XML data, complex full-text query expressions can be resolved efficiently. The fact that the search function is implemented as a built-in XQuery function enables XQuery developers to specify which portions of the XML structure are to be searched, using syntax which is already present in the XQuery language.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device, which stores, processes, routes, manipulates, or performs like operation on data. It is to be understood, therefore, that this disclosure is not limited to the particular forms illustrated and that it is intended in the appended claims to embrace all alternatives, modifications, and variations, which do not depart from the spirit and scope of the embodiments described herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A system for providing full-text search integration in XQuery, comprising:
   a storage device storing computer-executable program code;
   a processor executing the computer-executable program code in computer-executable program modules, comprising:
      an XQuery interpreter implementing a built-in search function defined in an XQuery language and initiating a full-text search, wherein the search function comprises one or more search terms and a relation logic;
      a search function implementation module identifying variants for each search term comprised in the search function and obtaining posting lists for one or more of the variants, each posting list comprising values offset from elements containing the search term associated with the variant to which the posting list corresponds;
      a postings resolution module applying the relation logic to the offset values of the posting lists and selecting those elements with offset values that satisfy the relation logic; and
      a posting module providing the elements that satisfy the relation logic to the XQuery interpreter as results of the full-text search.

2. The system according to claim 1, wherein the relation logic comprises at least one of Boolean operations, proximity and order relations, and flexible token matching.

3. The system according to claim 1, further comprising:
   an assignment module assigning a score to each result; and
   an order module ordering the results in descending order based on the assigned score.

4. The system according to claim 1, wherein the variants are identified using at least one of case-insensitive, spelling correction, and stemming routines.

5. The system according to claim 1, wherein the posting lists are filtered using at least one of union and intersection routines.

6. The system according to claim 1, wherein the offset values each comprise a location of the element containing at least one of the search terms in a sequence file.

7. The system according to claim 1, wherein the search function further comprises an XML node set to be searched using the search terms.

8. The system according to claim 7, further comprising:
   a directory module locating code associated with the search function; and
   an implementation module executing the code.

9. The system according to claim 1, wherein the search function comprises a search expression according to search (data, search-expression).

10. The system according to claim 1, wherein the elements are stored within lexicons and comprise XML syntax.

11. A computer-implemented method for providing full-text search integration in XQuery, comprising:
    implementing a built-in search function defined in an XQuery language and initiating a full-text search, wherein the search function comprises one or more search terms and a relation logic;
    identifying variants for each search term comprised in the search function and obtaining posting lists for one or more of the variants, each posting list comprising values offset from elements containing the search term associated with the variant to which the posting list corresponds;
    applying the relation logic to the offset values of the posting lists;
    selecting those elements with offset values that satisfy the relation logic; and
    providing the elements that satisfy the relation logic as results of the full-text search.

12. The computer-implemented method according to claim 11, wherein the relation logic comprises at least one of Boolean operations, proximity and order relations, and flexible token matching.

13. The computer-implemented method according to claim 11, wherein the results are ordered by:
    assigning a score to each result; and
    ordering the results in descending order based on the assigned score.

14. The computer-implemented method according to claim 11, wherein the variants are identified using at least one of case-insensitive, spelling correction, and stemming routines.

15. The computer-implemented method according to claim 11, wherein the posting lists are filtered using at least one of union and intersection routines.

16. The computer-implemented method according to claim 11, wherein the offset values each comprise a location of the element containing at least one of the search terms in a sequence file.

17. The computer-implemented method according to claim 11, wherein the search function further comprises an XML node set to be searched using the search terms.

18. The computer-implemented method according to claim 17, further comprising:
    locating code associated with the search function; and
    executing the code.

19. The computer-implemented method according to claim 11, wherein the search function comprises a search expression according to search (data, search-expression).

20. The computer-implemented method according to claim 11, wherein the elements are stored within lexicons and comprise XML syntax.

* * * * *